Oct. 11, 1955
J. D. ISAACS
2,720,047
HIGH-SPEED PLANKTON COLLECTOR
Filed March 19, 1953
2 Sheets-Sheet 2
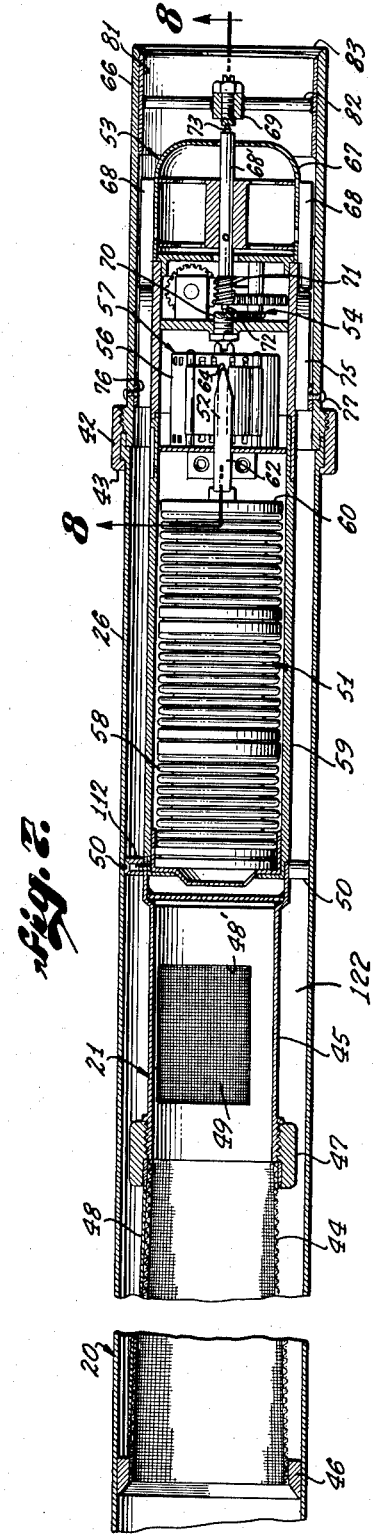
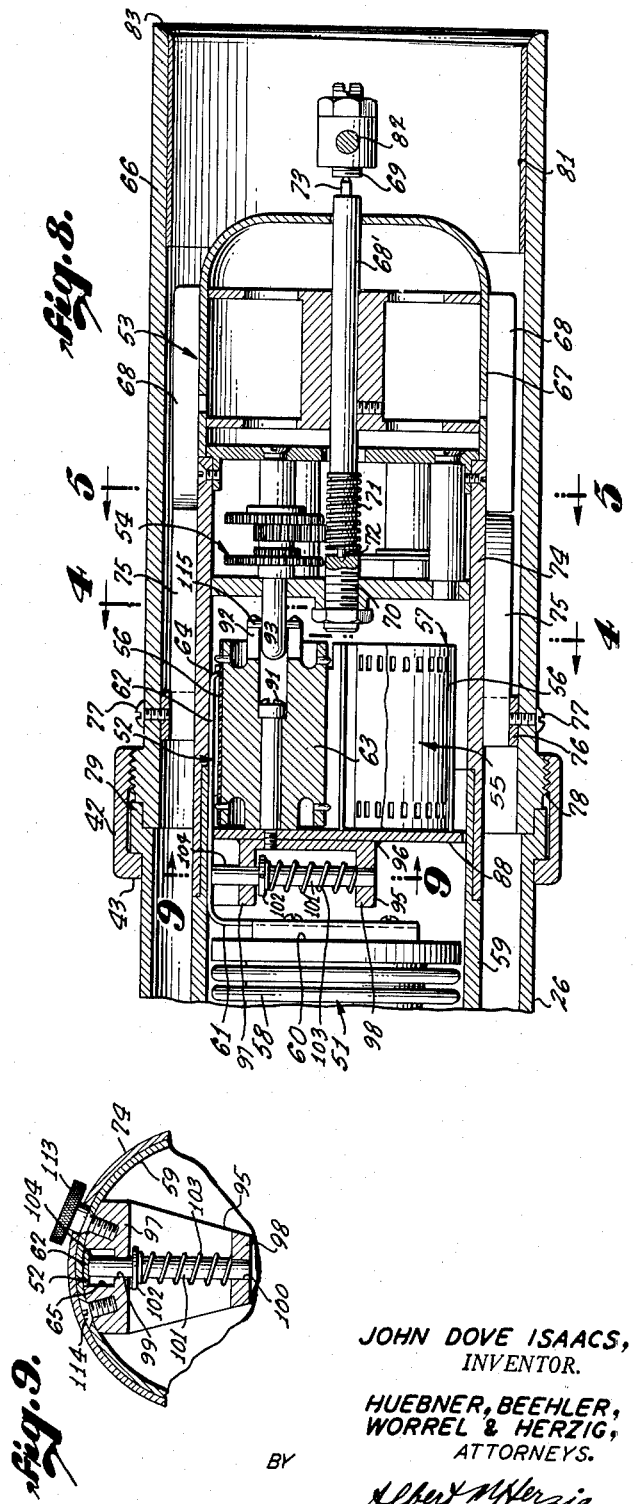
JOHN DOVE ISAACS,
INVENTOR.
HUEBNER, BEEHLER,
WORREL & HERZIG,
ATTORNEYS.

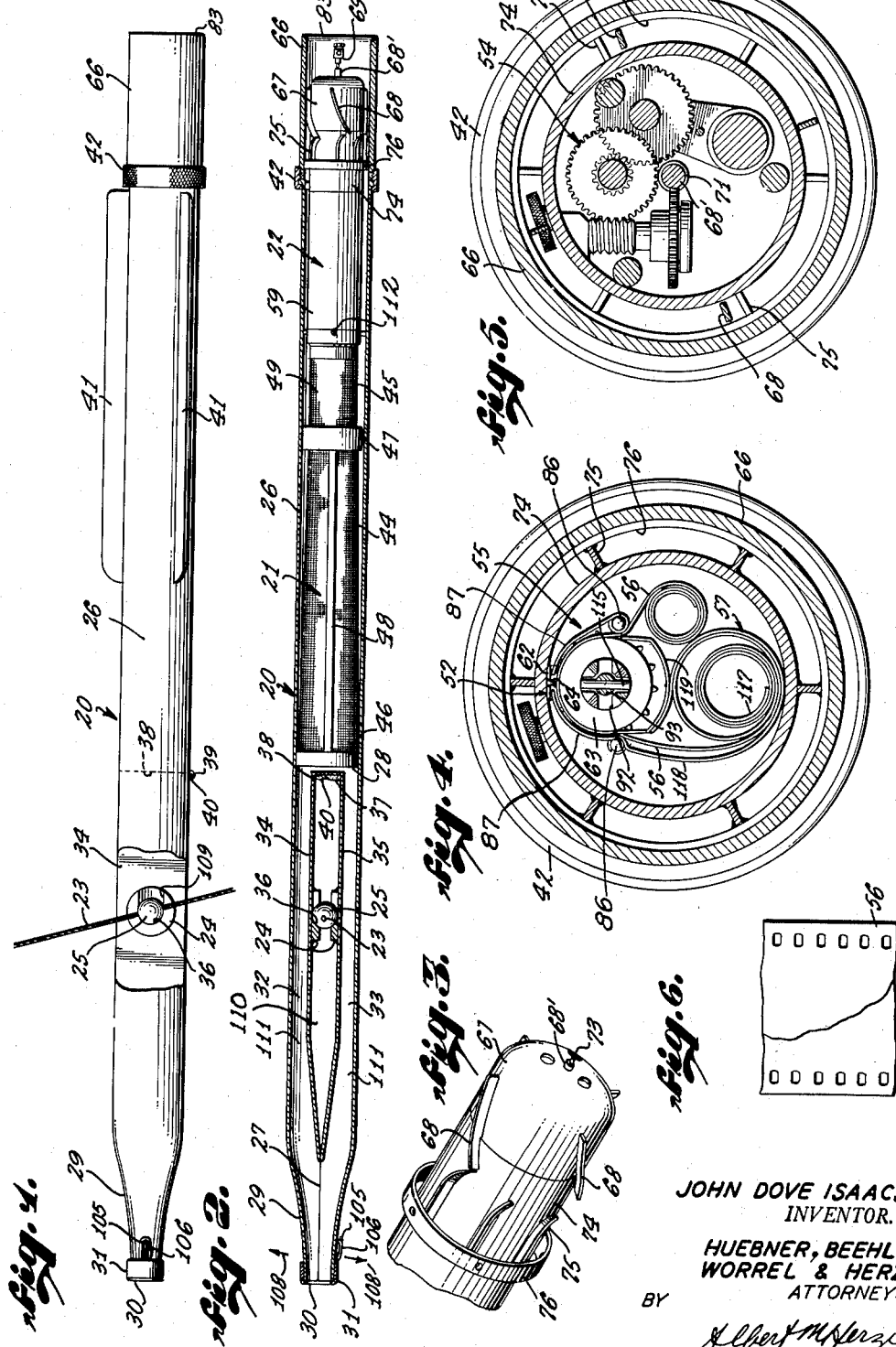

United States Patent Office 2,720,047
Patented Oct. 11, 1955

2,720,047

HIGH-SPEED PLANKTON COLLECTOR

John D. Isaacs, Encinitas, Calif., assignor to The Regents of the University of California, Berkeley, Calif., a corporation Application March 19, 1953, Serial No. 343,472

4 Claims. (Cl. 43—7)

This invention relates to a plankton collector, and more particularly to such a device normally towed behind an oceanographic or other ship, at the normal speed of the ship, so as to collect and sample the plankton through which it is towed while simultaneously recording the depth of the subject water and the volume thereof as related to distance travelled.

The ocean, and to some extent also the lake plankton community is a complex association of plants and animals which are grouped together because of their mode of living, and includes all free-floating organisms that drift more or less passively with the currents. It is a very diverse group, including organisms as small as bacteria or naked flagellates, some less than a micron in length, to macroscopic animals such as jellyfish. While most of the plant plankters, the phytoplankton, have such feeble means of locomotion that they may be considered passive, the animal plankters, the zooplankton, vary considerably in their powers of locomotion, so that, at times, it is difficult to draw the line between plankton and nekton, the more actively swimming animals of the sea. The diversity extends not only to size and motility but to distribution as well. The phytoplankton is confined mostly to the euphotic zone, a few hundred feet deep, where sufficient light is available for photosynthesis. Although the zooplankton is most abundant in this zone of primary food production, some organisms have a considerable depth range and some are confined to the mid-depths of the ocean. Many of the zooplankters move nearer the surface during the night, and then return to deeper layers during daylight hours. The extent of the vertical migration may be from only a few meters to some hundreds of meters. It may not only be different for the various species of plankton, but also for the several stages of the same species, and even for the same stage at different seasons of the year. This complicates the problem of sampling plankton organisms, and so also does the tendency of the plankton organisms to occur in patches or clumps.

Because of their diversity in size, motility and distribution, no satisfactory sampler has been developed for obtaining a fully representative sample of the organisms in the water. Every known type of plankton collector is undesirably selective in one way or another. Thus, it has not been found practical to use the same instrument—whether pumps, traps or nets—for sampling both phytoplankton and general zooplankton.

Samples obtained with plankton collecting gear may be classed, according to the distance covered in obtaining the same, into two principal categories: spot samples and strip samples.

A spot sample is one taken within a limited area. A vertical haul, in which the net is lowered and raised at one spot, is a simple type of spot sample. Standard oblique tows taken at very reduced vessel speeds and covering only a short distance (seldom more than half a mile) are also essentially spot samples.

Unless numerous samples are taken, the horizontal distribution of the plankton cannot be determined adequately by spot sampling. Also, the more agile plankters escape the net, especially during daylight hours.

Satisfactory spot samplers, however, would have several advantages, related particularly to depth sampling, inasmuch as they can be lowered to any desired depth and then hauled vertically, horizontally or obliquely to establish the depth distribution of the various organisms.

Strip samplers are designed for collecting a more or less continuous sample of the plankton along the route covered by a research vessel, and must be done at the normal cruising speed of the vessel, as otherwise the time required in collecting the samples would be prohibitive. By obtaining a more adequate sampling of the horizontal distribution of plankton organisms, and by preventing the more agile plankters from escaping the net, satisfactory strip samplers can overcome two of the disadvantages of spot samplers.

There are at least six requirements of a satisfactory high speed sampler:

(1) They should be usable in series of several samplers, e. g., 3 to 10, which can be spaced at desired depths in order to take depth as well as horizontal distribution of the plankton into account.

(2) The individual samplers should precede the towing wire, thus insuring that neither the towing wire nor the bridles will act as a scare, frightening off the more agile plankters.

(3) A suitable depressing force will be needed to get the samplers down to desired towing depths. This is an important consideration, because to get a sampler down to even moderate depths when a vessel is travelling at eight to ten knots requires considerable depressing force. A suitable depressor, consequently, is one of the essential components of high-speed sampling gear. A very satisfactory depressor for this purpose, as used with high-speed collecting gear, is disclosed in my co-pending applications, Serial Nos. 257,154 and D. 16,229. High-speed samplers by such equipment may be hauled as deep as 50 to 60 meters when used with a single depressor on ¼ inch cable. Using special wire and greater depressing force (such as two depressors in tandem), the samplers may be hauled as deep as 100 to 150 meters.

(4) Accurate metering of the water strained by a sampler is a basic requirement for quantitative sampling. Incorporation of an impeller and meter-type gear set into the design of a sampler is herein disclosed as a preferred means of accomplishing the metering purpose.

(5) An accurate record of the depth at which samplers are hauled is highly desirable. A means of accomplishing this is to incorporate a pressure bellows which records depth against flow, as also herein disclosed.

(6) The plankton material collected by the sampler should be recoverable in good condition.

In view of the above considerations, among others, it is among the objects of this invention to provide a new and improved high-speed plankton collector construction adapted to overcome the above-mentioned shortcomings of prior art devices, and to meet the above-referred-to requirements.

It is another object of this invention to provide a new and improved collector of the desired character described which has a water inlet velocity preferably equal to or greater than the speed at which the collector is towed.

Another object of this invention is the provision of such a collector and sampler wherein the water inlet is carried ahead of any interfering gear which might serve to warn or frighten out of its path any plankton sought to be sampled.

Another further object of this invention is the provision of compact and effective sampling means capable of being towed at speeds equal to that of any vessel without substantial friction while giving a substantially complete report of the conditions under which the sampling occurs, the distance travelled, and the depth, or other desired information.

Yet another object of this invention is the provision of new and improved, simplified and hydrodynamically correct and effective means to carry out the intended objectives, and to improve over prior art devices heretofore intended to accomplish generally similar purposes.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

Figure 1 is a side view, parts being cut away, of a plankton collector or sampler embodying this invention.

Figure 2 is a top view, a portion of the cover being removed to show the relationship of the internal parts.

Figure 3 is a fragmentray perspective view of a depth-flow meter as embodied in this invention.

Figure 4 is a vertical sectional view taken as on a line 4—4 of Figure 8.

Figure 5 is a vertical sectional view taken as on a line 5—5 of Figure 8.

Figure 6 is a fragmentary view of a portion of a film record as made by the instant apparatus.

Figure 7 is an enlarged fragmentary view in horizontal section, parts being cut away, of the rearmost half of the collector.

Figure 8 is a vertical sectional fragmentary view, enlarged, as on a line 8—8 of Figure 7.

Figure 9 is a detailed fragmentary vertical sectional view taken as on a line 9—9 of Figure 8.

Referring more particularly to the drawings, there is shown by way of illustration and not of limitation, a high-speed collector 20 comprising a streamlined tube containing a plankton net at 21, and a depth-flow meter at 22.

When assembled for operation it has a preferred over-all length of 130.3 centimeters, a basic diameter of 7.6 centimeters, and a weight of 17.3 pounds (7.7 kilograms).

The dimensions, weights and materials herein, as above stated, are cited merely as illustrative.

The collector 20 is attached to a towing cable 23 by a partially spherical brass cable clamp 24, and ball 25, as more particularly described in my said co-pending application, Serial No. 257,154.

An outer casing, 115.0 centimeters in over-all length, is made of brass with a wall thickness of 0.12 centimeter. Its weight is 10.3 pounds (4.7 kilograms). The posterior 62.3 centimeters (aft of dotted line 38, Figure 1) is a cylindrical tube of 7.6 centimeters outside diameter. The forward 53.0 centimeters is longitudinally divided at 27 to accommodate attachment to the towing cable 23 some distance behind the mouth 30 of the collector. The anterior 15.2 centimeters tapers at 29 from the basic diameter of 7.6 centimeters to a diameter of 2.5 centimeters at the mouth 30 of the collector.

The anterior 12.8 centimeters, although divided to permit passage of the towing cable, is held tightly together during actual use by means of a frictionally held steel nose ring 31. Beyond this, the tube is partitioned into two sections 32 and 33 (40.2 centimeters in length) by the addition of secondary walls 34 and 35. The divided socket 24 that receives the spherical cable clamp is attached to the secondary walls 38.7 centimeters from the mouth 30 of the collector. Each half of socket 24 is a circular pad 5.0 centimeters in diameter, each concave cable clamp socket 36 therein being 3.9 centimeters in diameter and 2.4 centimeters deep. A protective bumper 37 is attached at the posterior edge 38 of the divided section 32—33. It is constructed of a 5.8 centimeter length of brass rod 39, 0.7 centimeter in diameter, which is covered by a 2.8 centimeter length of tough rubber tubing 40.

Three radially displaced stabilizing fins 41 are located at the rear section of the tube. The fins start 2.8 centimeters from the back edge of the tube and extend forward for a length of 40.6 centimeters. They are constructed of brass 0.17 centimeter in thickness and extend radially from the tube 1.9 centimeters.

A brass locking ring 42, 2.3 centimeters wide, with an outside diameter of 8.6 centimeters and a wall thickness of 0.2 centimeter, is attached to the back end of the tube. The ring is threaded inside and has a knurled outer surface. It turns freely on the tube but cannot come off because of a flange 43 around the posterior edge of the tube. The fins 41 prevent the ring from sliding forward.

The plankton net 21 preferably comprises two sections: the body or straining section 44, and a detachable cod-end cup 45.

The straining section 44, truncate conical in shape, is made of monel metal mesh having about 11½ meshes to the centimeter. It is supported by brass rings 46 and 47 at its respective ends, and by three strengthening ribs 48. The over-all length of the body of the net is 35.5 centimeters; the forward supporting ring 46 has a diameter of 6.9 centimeters and a width of 1.4 centimeters; the posterior ring 47 has a diameter of 6.2 centimeters, a width of 2.4 centimeters, a wall thickness of 0.4 centimeter, and is threaded on the inside for attachment to the cod-end cup 45.

The cylindrical brass cod-end cup 45 has a depth of 10.5 centimeters, an outside diameter of 2.0 centimeters and a wall thickness of 0.1 centimeter. Two large windows 48', approximately 5.0 centimeters square, are cut out of the sides of the cup. Over these are stretched screens 49 of monel metal with 100 meshes to the inch. The cod-end cup 45 is attached to a bellows case by three evenly spaced screws 50.

The depth-flow meter 22 preferably comprises three sections: a pressure unit 51 with attached stylus 52, a metering unit comprising an impeller 53 and reduction gear set 54, and a recording unit 55 comprising 35 millimeter clear acetate film 56 with spooling devices 57.

The pressure unit 51 uses a bellows 58, housed in a brass tube 59, 17.6 centimeters long, with an outside diameter of 5.5 centimeters and a wall thickness of 0.15 centimeter. Attached to the back end 60 of the bellows 58 in said stylus 52 of preferred L-shaped brass. The stylus is 0.6 centimeter wide and 0.07 centimeter thick. One leg 61 of the L (3.9 centimeters long) is attached to the bellows, the other leg 62 (4.2 centimeters long) extends out over a sprocketed film spool 63 and terminates in a short (0.1 centimeter) hook 64. A space 65 (Figure 9), 3.3 centimeters in length, is left at the rear portion of the housing tube 59.

The metering unit is located at the posterior end of the collector. It consists essentially of the impeller 53, the gear train 54, and a terminal outer housing portion 66.

The impeller 53 is a cylindrical drum 67 having four curved, equally spaced fins 68. The cylindrical drum 67, kettledrum shaped, is 4.6 centimeters long and has an outside diameter of 5.7 centimeters. The curved fins 68 are 5.0 centimeters long, 0.8 centimeter wide by 0.2 centimeter thick; they project 1.5 centimeters forward of the drum 67. The impeller has a coaxially attached shaft 68' which is supported at its ends in jewel bearings 69 and 70.

Incorporated in the forward end of the shaft 68' is a worm gear 71 in addition to the bearing pin 72. Said worm gear 71 is 0.6 centimeter in diameter and 1.2 centimeters in length. The shaft 68' extends forward from the drum a total distance of 2.7 centimeters. The extension at the rear is 0.7 centimeter in length, including a bearing pin 73.

The gear set 54 is contained in a brass cylinder 74 immediately forward of the impeller 53, and is 8.4 centimeters long, has an outside diameter of 5.7 centimeters, and a wall thickness of 0.1 centimeter. The gear set is contained in the posterior third of the cylinder 74. The anterior two-thirds houses the spooling mechanism 57 and film 56, when the sampler is assembled.

To hold the cylinder 74 rigidly in place and yet allow water to pass freely between it and the outer casing 66, there are six curved ribs 75 welded to the inner cylinder but fitting snugly against the outer casing 66. These brass ribs 75 are 0.8 centimeter wide, 4.6 centimeters long and 0.2 centimeter thick. Flush with the top edge of the ribs at their forward end is welded a brass ring 76, of 7.4 centimeters outside diameter, 0.8 centimeter wide and 0.2 centimeter thick, serving to attach the inner cylinder 74 to the outer casing 66. Six screws 77 are used.

The outer housing 66 is a brass tube 15.2 centimeters in length, 7.6 centimeters in outside diameter, with a wall thickness of 0.1 centimeter, threaded at 78 for releasable securement to the housing 26 as by means of a flange 79 on the latter and a knurled and threaded locking ring 42 for attachment to the inner cylinder. Inserted into the posterior end of the casing is a snug-fitting brass band 81, 3.5 centimeters wide by 0.2 centimeter thick. A rod-shaped posterior support 82 for the impeller extends across the casing about 2.0 centimeters forward of the back edge 83.

The recording unit 55 is housed between the pressure unit 58 and the metering unit 54. It comprises a roll of 35 millimeter clear acetate film 56 on which the record is inscribed, the stylus 52 attached to the bellows 58 which marks the film, the sprocket 63 geared to the metering unit which advances the film, and guide posts 86 and leaves 87 which hold the film in place and aid in its spooling.

The sprocket and guide posts are attached to a brass disc 88, 5.3 centimeters in diameter and 0.1 centimeter in thickness, which is fastened to the pressure unit as by two screws. The cylindrical sprocket 63, 3.5 centimeters long and 1.9 centimeters in diameter, has a row of teeth on either end for meshing with the marginal perforations in the 35 millimeter film.

The outer tube 26 serves as a housing for the plankton net 21, 44, and metering units 51, 55, 53. The divided forward section 32, 33, allows the collector to be slipped over the towing cable 23 to reach an attachment 24 about a third of the way back along the tube.

The ogived anterior end 29 of the outer tube serves to streamline the collector and provides transformation from the diameter of the inlet 28 to the diameter of the housing and the outlet 83. The ratio of inlet area to outlet area was so chosen as to produce a pressure differential opposing the pressure drop resulting from water flow through the collector, the combination of the two producing a mean inlet velocity not less than the velocity of tow.

The bumper 37 at the back edge 38 of the divided section protects both the towing cable 23 and the tube 26 when the angle of the cable relative to the collector is sufficiently small so that the trailing portion of the cable 23 rubs against the bumper 37. (An experimental collector which was not provided with this bumper cut nearly through the towing cable during a trial run, whereas collectors provided with the bumper have not caused injury to the towing cable.)

The fins 41 on the tube serve to hold the tube steadily in a horizontal position during towing.

The locking ring 76 at the posterior end of the tube serves as a means of attaching and holding the net 21 and the depth-flow meter 22 in position within the tube.

The function of the plankton net 21 is to strain out and retain the plankton organisms that are present in the water column passing through the collector. To remove the sample from the net, a jet of salt water is played along the outside of the conical screen 44 dislodging and washing into the cod-end cup 45 any adhering plankton. The conical screen 44 is then removed by unthreading at 47, and the sample further concentrated by patting on the outside of the mesh 49 of the cup, holding a quantity of water in the cupped hand. The sample is then poured into a four-ounce jar, or other suitable container, labeled, and a preservative added.

The pressure unit 58 in the depth-flow meter contracts with increasing pressure such as that produced by lowering the unit in the water. The pressure units are selectively effective, for example, to depths of 180 feet (approximately 50 meters), to 450 feet (137 meters), and to depths of 900 feet (274 meters). On contracting or expanding, the pressure unit moves the attached stylus 52 across the acetate film. Once the unit has been calibrated, towing depths may be readily determined by simple analysis of the acetate record as marked thereon by the stylus point 64.

The function of the depth-flow meter 22 (impeller 53 and gear train 54) is to meter the water flowing through the collector. It is geared to the sprocket 63 through the gear train 54, that serves as the advancing mechanism for the clear 35 millimeter acetate film 56, fastened to the wall 88 by a stud shaft 91 on the underside of the pressure element, and is releasably splined as at 92 to the gear train by means of a slow-turning take-off shaft 93. The amount of water passed through the collector can thus also be calculated from the stylus trace recorded on the clear 35 millimeter film.

Referring particularly to Figures 7, 8 and 9, a bracket 95 secured to the wall 88 as by solder 96 has arms 97 and 98 having axially aligned bores 99 and 100 adapted for the slidable accommodation of a pin 101 mounting a washer 102 keyed thereto against axial movement and normally urged upwardly, as shown in Figures 8 and 9, for example, as by a coil spring 103, in a manner to urge the upper end 104 of a pin into yieldable engagement against the leg 62 of the stylus, so as to regulate the pressure of the stylus point 64 against the acetate film 56.

The above apparatus may be readily assembled and disassembled in the embodiment under discussion. Thus, the nose ring 31 may be slipped forward, as permitted by a split ring 105 normally releasably engageable with a complementary ring 106, the ring 105 being integral with the nose ring 31, and the ring or loop 106 being integral with the case 26 of the collector. The removal of the nose ring 31 permits the two hollow halves 32 and 33 of the anterior portion of the collector to be spread radially apart in the directions shown by opposed arrows 108, thereby spreading the two pads 24 relatively apart to permit the insertion of the swivel ball 35 therebetween and into the partially spherical recesses 36 thereof for use. Said swivel ball 25 may, in any event, be inserted for swiveling containment by said recesses 36 upon preferred slight spreading movement of said halves 32 and 33 by the provision of rearwardly directed slots 109 provided in said pads 24. The cable 23 is thereby permitted to move relatively forwardly and rearwardly, and to some extent around the axis of the collector as a pivot by virtue of the opening 110 between the two halves 32 and 33, thereby defining twin channels 111 at opposite sides of the opening 110 communicating forwardly with the opening 30 at the mouth of the collector.

Unthreading of the knurled coupling ring 42 releases the tail-piece 66 containing the depth flow meter 22, including the bellows 58 and the bellows housing 59, together with the cod cup 45 and net 21. The latter elements being secured together, as aforesaid, are axially slidable within the outer shell 26, but are centered within said shell as by ring 46 and three sleeves 112, each respectively surrounding and secured by the axially directed screws 50. The strainer 21 is removable from the cod-end cup 45 by unthreading of the sleeve 47. The cod-end cup is removable from the bellows housing 59 by unthreading of the three bolts 50. The housing 59 is removable from the housing portion 74 by the unthreading of a knurled finger bolt 113, by virtue of which the housing portions 74 and 59 are axially slidably separated from their otherwise overlapped interengagement. The housing 59, during such latter separation, carries with it, by virtue of a screw 114, the bracket 95, to which the circular wall portion 88 is connected. The acetate film 56 and its associated winding mechanism is thereby exposed for ready manipulation, winding or unwinding.

When the two housings 59 and 74 are separated, as last above mentioned, the splined securement 92 of the spool 63 to the gear box and train 54 readily frees a transverse pin 115 carried in the gear shaft 93 from the axially extending spline fingers of securement 92. The acetate film 56 is thus normally wound into a tight but free spool and passes around the spool 57 under a guide 87, which is open at the stylus 64 to permit the stylus to engage the film. The teeth of the sprocket 63 lead the film also under the guide portion 87 and a guide-post 86, whence it is freely wound into a loose coil 117 by virtue of another curved guide portion 118, which includes a shield part 119 to prevent the film from engaging the sprocket in said loosely coiled condition at 117.

The gear box and train 54 is of any desired form known to those skilled in the art, and may correspond to a clockwork gear system which, if desired is adjustable as to speed by the selective engagement of any desired gears, or in any other fashion, as by means of a control screw accessible through the forward wall of the gear box.

In the use and operation of the collector, water enters the nose through the ring 31 and takes a bifurcate path through the twin passages 111, and then passes into the mouth of the conical net 21. From said net 21 most of the water passes into the annular space 122 between the net and the housing 26, but some also passes into the cod-end cup 45 and thence through the screened windows 48' thereof likewise into said annular passageway 122. Said passageway 122 conducts the water to the vanes 75 and the impeller blades 68 so as to turn the impeller 53.

No effort is made to prevent the water from entering any portion of the mechanism, whose operation includes an assumption that the entire device may be filled with water, or air compressed by water pressure, both to resist external pressure and to operate the bellows 58.

Rotation of the impeller 53 turns the gear train 54, which greatly reduces the number of revolutions of the take-off shaft 93 and slowly rotates the spool 63 so as to give a longitudinal score-line to the film 56 by virtue of the stylus point 64 to indicate, according to a predetermined calculation, the distance travelled, or the volume of water passed through the device. Simultaneously, the depth affects the bellows 58, whose compression moves the stylus to the left, as seen in Figure 7, for example, so as to indicate, according to Figure 6, in a predetermined manner, also the depth at which the sampling is being made.

It has been found that the velocity of the entering stream of water is such that when the collector is towed at any customary speed, everything in the path thereof is sampled. Sometimes even core portions out of fish which have been caught swimming in the path of the device are found deposited in the net 21. This is partially due to the fact that the hydrodynamic design of the apparatus permits the setting up of a flow pattern which precedes the collector and forms a water jet directed into the mouth 30 of the device, which tends to insure the capture of all forms of plankton, whether they be slow moving or fast moving.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

I claim:

1. A plankton collector for oceanographic use comprising: a hollow tubular housing means having a tapered front end terminating forwardly in a relatively constricted inlet, said housing terminating rearwardly in an open, substantially unconstricted end, net means secured across the interior of the housing for straining water passing through the housing, recording means mounted in the housing for recording preselected properties of the water passing through the housing, means for forcing the housing axially through the water, and fin means on the exterior of the housing for stabilizing the same in its said axial movement.

2. A plankton collector for oceanographic use comprising: a hollow tubular housing means having a tapered front end terminating forwardly in a relatively constricted inlet, said housing terminating rearwardly in an open, substantially unconstricted end, net means secured across the interior of the housing for straining water passing through the housing, recording means mounted in the housing for recording preselected properties of the water passing through the housing, means for forcing the housing axially through the water, and fin means on the exterior of the housing for stabilizing the same in its said axial movement, said forcing means comprising a tow attachment means spaced rearwardly from said constricted front end of the housing.

3. A plankton collector for oceanographic use comprising: a hollow tubular housing means having a tapered front end terminating forwardly in a relatively constricted inlet, said housing terminating rearwardly in an open, substantially unconstricted end, net means secured across the interior of the housing for straining water passing through the housing, recording means mounted in the housing for recording preselected properties of the water passing through the housing, means for forcing the housing axially through the water, fin means on the exterior of the housing for stabilizing the same in its said axial movement, and spacing means between the housing and the recording means for securement of the recording means in a centered position within the housing spaced from the housing wall and defining an annular passageway through the housing communicating forwardly with said inlet.

4. A plankton collector for oceanographic use comprising: a hollow tubular housing means having a tapered front end terminating forwardly in a relatively constricted inlet, said housing terminating rearwardly in an open, substantially unconstricted end, net means secured across the interior of the housing for straining water passing through the housing, recording means mounted in the housing for recording preselected properties of the water passing through the housing, means for forcing the housing axially through the water, and fin means on the exterior of the housing for stabilizing the same in its said axial movement, said forcing means comprising a tow attachment means spaced rearwardly from said constricted front end of the housing, said tow attachment including said tapered front end of the housing having a longitudinal slot and wall means forming a bifurcate passageway around said slot, said bifurcate passageway communicating rearwardly with said net means.

References Cited in the file of this patent

UNITED STATES PATENTS

| 2,366,184 | Dean | Jan. 2, 1945 |
| 2,367,997 | Chambers | Jan. 23, 1945 |